(12) United States Patent
Reddoch

(10) Patent No.: US 6,170,580 B1
(45) Date of Patent: Jan. 9, 2001

(54) METHOD AND APPARATUS FOR COLLECTING, DEFLUIDIZING AND DISPOSING OF OIL AND GAS WELL DRILL CUTTINGS

(76) Inventor: Jeffery Reddoch, P.O. Box 82098, Lafayette, LA (US) 70598-2098

(*) Notice: Under 35 U.S.C. 154(b), the term of this patent shall be extended for 0 days.

(21) Appl. No.: 08/896,206

(22) Filed: Jul. 17, 1997

(51) Int. Cl.⁷ ...................................................... E21B 21/00
(52) U.S. Cl. .......................... 175/66; 175/206; 175/207; 209/12.1; 209/306; 210/112; 210/804
(58) Field of Search ............................. 175/66, 206, 207; 209/12.1, 305, 306, 300, 281, 283; 210/415, 804, 112

(56) References Cited

U.S. PATENT DOCUMENTS

| | | | |
|---|---|---|---|
| 3,966,607 | * | 6/1976 | Gaynor et al. ...................... 210/415 |
| 4,528,098 | * | 7/1985 | Treyssac et al. .................... 210/415 |
| 4,818,402 | * | 4/1989 | Steiner et al. ...................... 210/411 |
| 5,489,383 | * | 2/1996 | Yoshikawa ......................... 210/415 |
| 5,833,851 | * | 11/1998 | Adams et al. ...................... 210/415 |
| 5,842,529 | * | 12/1998 | Dietzen ................................ 175/66 |

* cited by examiner

Primary Examiner—George Suchfield
(74) Attorney, Agent, or Firm—Robert N. Montgomery

(57) ABSTRACT

A method and system for collecting, defluidizing and disposing of oil and gas well drill cuttings is disclosed including a system consisting primarily of a separation tank assembly, a vacuum pump assembly, a solids collection box and a liquids collection tank. The seperating tank having an upper slurry chamber, for recieving cuttings via suction from a shaker screen trough via a suction line, and a lower liquid chamber having a strainer therein, for collecting liquids compressed from the drill cuttings. A helical conveyor screw is passed through the upper slurry chamber and the strainer located in the lower liquid chamber. An adjustable plug is provided to restrict the cuttings flow through the strainer discharge opening. When cutting are forced from the upper slurry chamber via the helical conveyor screw into the strainer against the preset tension of the adjustable plug, fluids are forced through the sides of the strainer into the lower liquid chamber where they are pumped out to a liquids collection tank. The defluidized cuttings are then expelled by forcing the plug open and gravity fed into a solids cutting box. The full cuttings boxes are then removed from the platform for disposal. Alternatively the cuttings may be discharged from the separator into an injection module for slurryfication and injection into the site well formation.

9 Claims, 5 Drawing Sheets

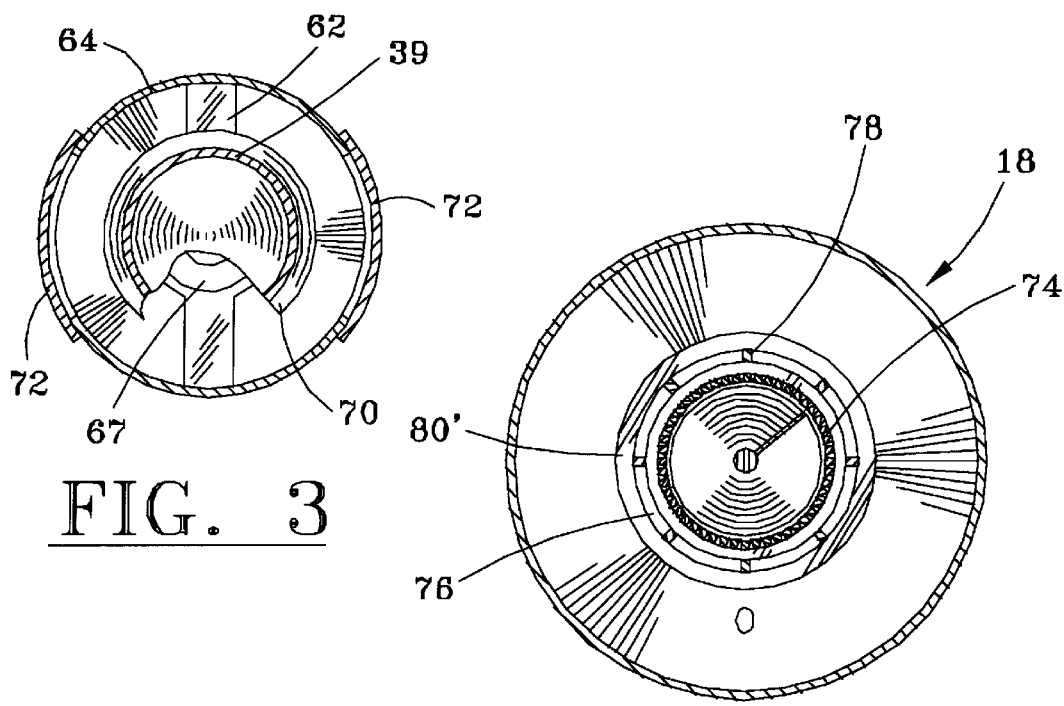
FIG. 3
FIG. 4
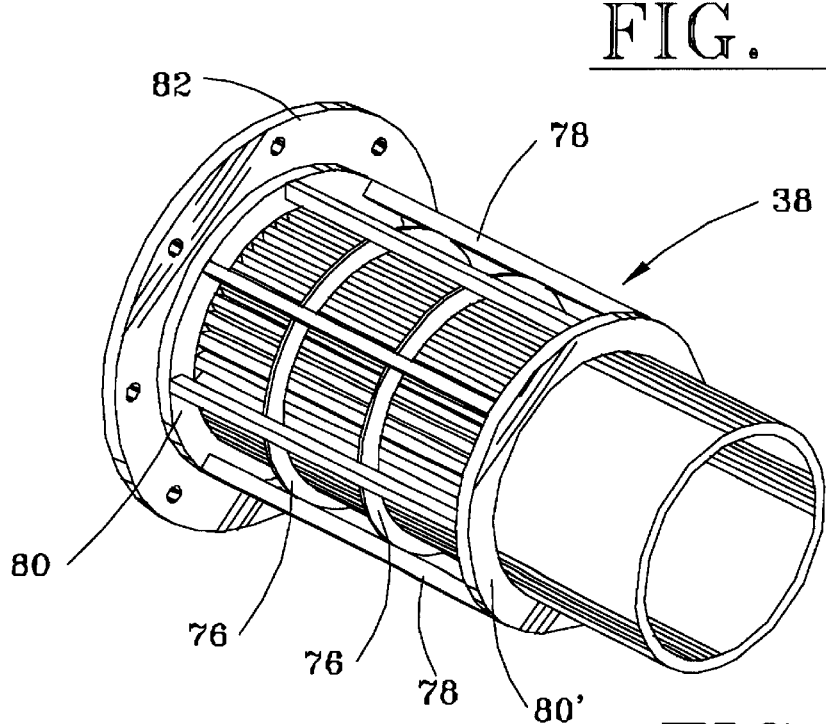
FIG. 5

METHOD AND APPARATUS FOR COLLECTING, DEFLUIDIZING AND DISPOSING OF OIL AND GAS WELL DRILL CUTTINGS

SPECIFICATION

Background of the Invention

1. Field Of The Invention

This invention relates to the collection of fine drill cuttings from a shaker discharge trough and more particular to defluidizing the cuttings by compression and the collection of the defluidized cuttings for transport and disposal.

2. General Background

In oil well drilling operations, drilling fluids containing various lubricants and chemical agents called "additives" are circulated downwardly through the drill string to lubricate the drill bit and assist in the removal of cuttings as they are flushed to the surface through the annulus around the drill pipe. The cuttings are then processed by passing them over a series of cascading shaker screens thereby removing most of the drilling additives and oily residue. The drilling fluids are then recovered for reuse. The cuttings comprised of shell, rock, sand etc. which do not pass through the shaker screens are then collected for transport to a land reclamation site or may be further processed for reinjection into the annulus of the well bore being drilled.

Methods used for transporting cutting from the shaker screens, to cuttings collection boxes is well known within the art. Cuttings and any residual fluids may be simply gravity fed from a collection trough to a conveyor or pumped by any number of methods to a collection box. The use of vacuum systems or pneumatic conveying systems may also be employed, both of which are widely used in the oil and gas industry. Some attempts have been made to reduce the volume of the fine cuttings by separating the fluid from the cuttings by simply siphoning any residual fluids off the cuttings at the point of collection in a cuttings box such as that illustrated by U.S. Pat. No. 5,402,857. Such methods have proven to be only partially effective leaving a large percentage of the residual fluids in the cuttings which must be transported.

It is an objective of the present invention to reduce the fluid content of the cuttings to its lowest possible level and recover the fluids separately for reuse or disposal thus reducing the weight of the cuttings to be transported and reducing the environmental impact.

SUMMARY OF THE PRESENT INVENTION

The present invention provides a method of collecting fine drill cuttings from the shaker screen collection trough via a vacuum line and passing the cuttings through a separating tank having a defluidizing screw press and delivering the defluized cuttings to a cuttings box for transport. The system comprising a suction line extending from a shaker screen, cuttings trough to a vertical cylindrical separating tank having a conical bottom, the tank being divided into an upper slurry portion and a lower liquid collection portion, further comprising a screw press passing through the upper slurry portion and liquid portion, a discharge means in the screw press for delivering defluidized material to a collection and transport box, a pump means for removing fluid from the lower liquid collection portion and a vacuum pump for creating a suction on the upper slurry portion thus importing the cuttings from the shaker trough.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a cross section view taken along sight lines 3—3 in FIG. 2;

FIG. 4 s a partial section view taken along sight line 4—4 in FIG. 2;

FIG. 5 is a isometric view of item 38 seen in FIG. 2.

DETAILED DESCRIPTION OF THE PREFERRED EMBODIMENT

Figure 1:
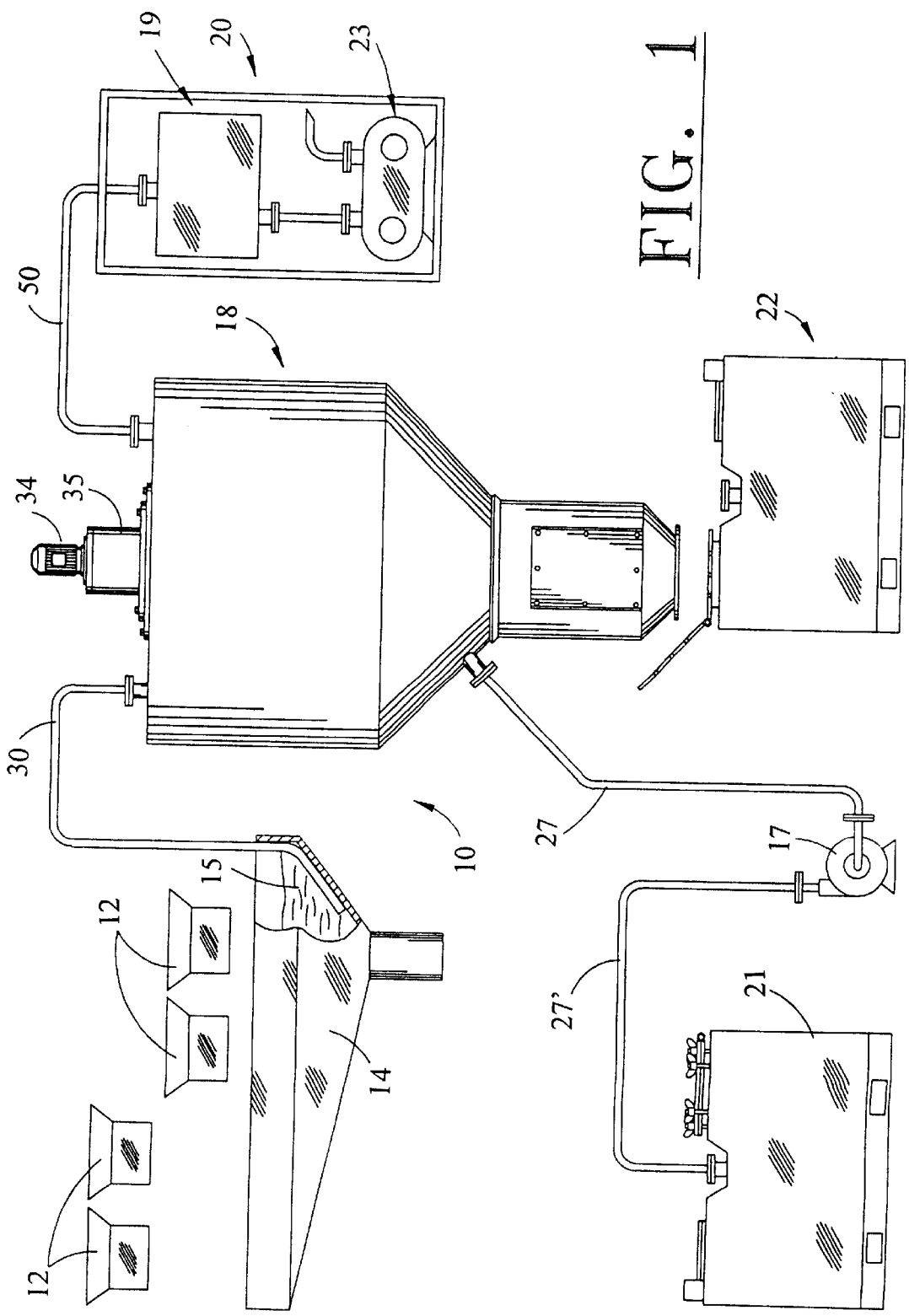
FIG. 1 is a block diagram of the system components.
Figure 2:
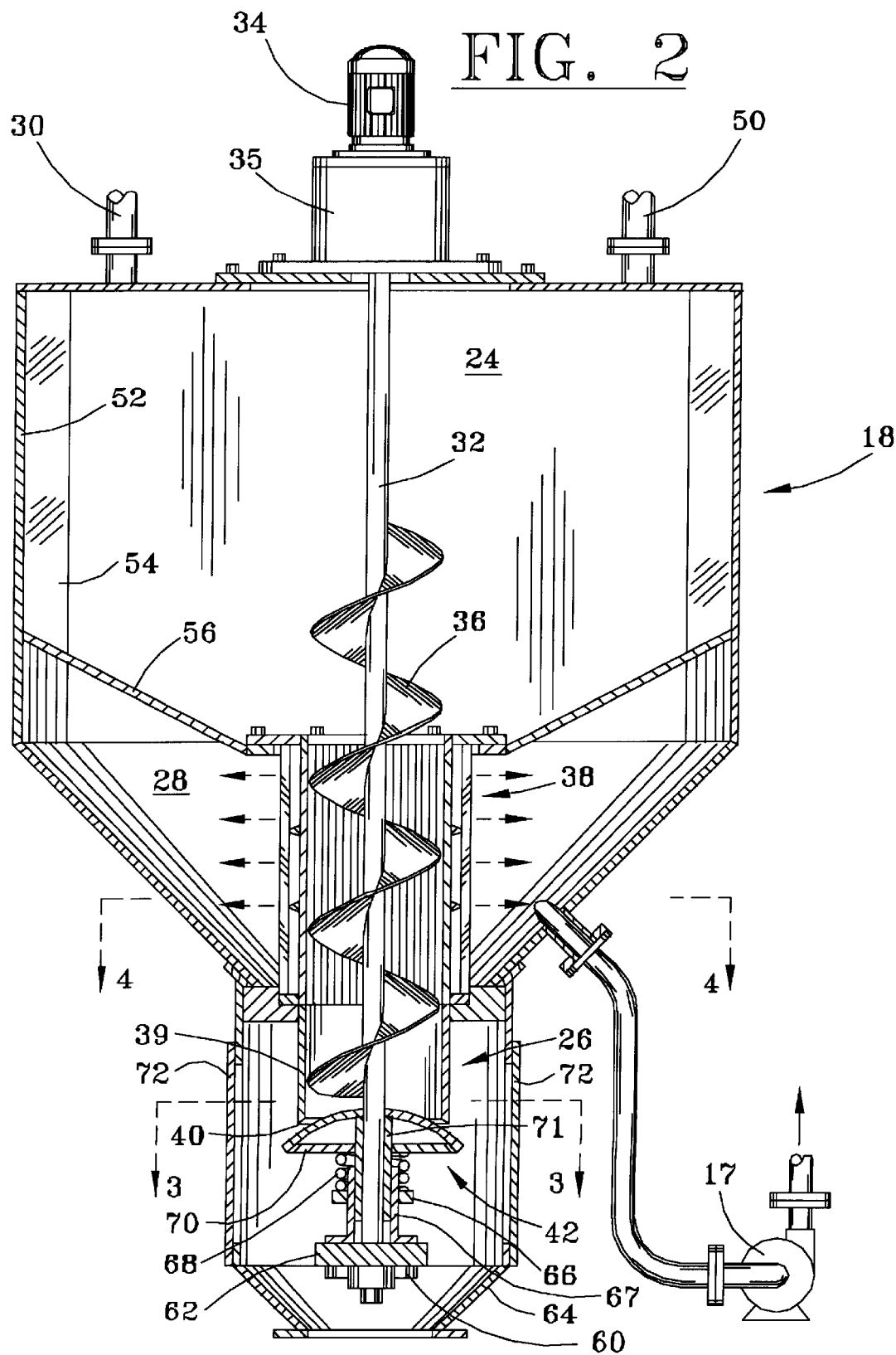
FIG. 2 is a cross section elevation of the vacuum tank and screw press.

FIG. 1 illustrates the general arrangement of the cuttings removal and processing system 10 wherein cascading shaker screens 12 discharge cuttings 15 in a slurry into a trough 14. The system comprises a separation tank assembly 18, a blower or vacuum pump skid unit 20 a cutting collection box 22 a pump 17 and a liquids collection tank 21. The separation tank assembly 18 is comprised of an upper inflow chamber 24 as shown in FIG. 2 and a screw press assembly 26 in communication with the upper inflow chamber 24 and a lower liquid chamber 28. The screw press assembly 26 being an apparatus for the conversion of liquid/solids mixture into a semidry solid mass. The separating tank assembly 18 includes a inflow chamber 24 for the inflow and overflow of the slurry 15 containing solids in suspension, a vacuum feed line 30 in communication with the slurry 15 in shaker trough 14, a helical conveyor screw 32 driven by a drive motor 34 by means of a gearing 35, passing through the inflow chamber 24 and extending through a separating strainer screen or basket 38 located in the lower liquid chamber 28, culminating at a discharge opening 40, where a spring operated spherical plug assembly 42 provides closure of the discharge port or opening 40, a vacuum hose 50 connecting the inflow chamber 24 of separation tank 18 to the vacuum pump skid 20, and a pump 17 for discharging liquid accumulation in the lower chamber 28 of the separation tank 18 to a liquid receiving tank 21 via discharge lines 27, 27'. The vacuum pump skid 20 further comprises a filtration unit 19 for removing any air born fine cuttings prior to entering the blower or pump unit 23.

In operation, initially the wall surfaces 52 and baffles 54 of the tank 18 in the inflow zone of upper chamber 24, as seen in FIG. 2, permits the undisturbed formation of a layer of solid cuttings as result of baffles 54 adjacent to the housing wall 52 and partition 56. The layer then migrates into the lower liquid separation chamber 28 in the form of a growing solids cake since the heavier materials settle to the lower extremities where they finally collect at the end of the helical screw 36 as a solid mass filling the volume of the annular space within the cylindrical separator strainer basket 38.

The rotating helical screw auger 36 continues to transports solids from the upper inflow zone 24 through the strainer basket 38 towards the discharge port 40 while the pressure is rising towards the terminal end of the screw 32 as a result of the spherical plug assembly 42 being preset to a specific spring tension thus keeping the discharge port 40 closed. During this compression stage, there occurs a defluidizing of the cuttings slurry accumulated in the strainer basket 38 thus forcing fluids through the walls of the strainer basket 38 into the liquids chamber 28. Under the action of the pressure generated by the screw press 32, the solids produced in this manner are pushed forwardly out of the discharge opening 40 by forcing the plug assembly 42 open against its preset spring setting established by the threadably adjustable collar 66. The solids slug beginning at or near the end of the strainer basket 38, the slug ends at the solids discharge opening 40 defined by the tubular extension tube 39. About 75% of the solid slug is situated in the strainer basket 38 and the remainder, is situated in the extension 39. The forces generated by the screw 32 compress the elastic cuttings slug between the walls of the cylindrical strainer basket 38 and the spherical plug assembly 42 to the extent that the fluids cannot penetrate through the solid slug or be ejected with the slug. The cylindrical screw shaft 32 fills the center of the solids slug and thereby prevents the penetration of the liquid into the axial area of the press slug, which otherwise is only under a slight compressive stress.

The fluid squeezed from the slug in the above manner is therefore forced through the slots of the strainer basket 38 and does not endanger the stability of the solid slug. The tubular extension 39 encloses approximately 25% of the slugs length. The force applied to the spherical plug assembly 42 insures near complete defluidization of the cuttings materials prior to discharge into cutting box 22.

As seen in FIG. 2 the helical shaft 32 and its helical screw portion extend through both upper and lower chambers 24,28 with the helical screw portion 36 stopping or culminating within the solids discharge extension tube 39 with the shaft 32 extending through the hemispherical plug assembly 42, and the cross member 62 and retained thereto by shaft bearing 60.

FIG. 3 shows a top view of the hemispherical configuration of the plug assembly 42, it furthers shows the sleeve member 67 supported by a cross member 62 attached to the inside of housing 64 in a manner whereby an opening is provided on either side to allow for the solids to pass. The plug assembly 42 seen in FIG. 2, comprises a hemispherical plug having a tubular stem portion 71 extending therethrough which is slidable and rotatable relative to the sleeve member 67 and about the helical screw shaft 32 and further comprises an adjustment collar 66, sleeve member 67 and a spring 68 for urging the hemispherical plug portion 70 into contact with the tubular extension at opening 40. The adjustment collar 66 sleeve member 67 and spring 68 supported by cross member 62 telescopically receives the tubular stem portion 71 and provides threadable adjustment for tensioning the spring 68 against the hemispherical member 70. Clean out covers 72 are also provided on the exterior sides of the housing 64. As seen in FIGS. 4 and 5, construction of the strainer basket 38 is comprised of axially extending parallel triangular strainer rods 74 held together in circumferentially spaced relationship by supporting rings 76 which may be of annular or spiral form. The strainer rods 74 are spaced to pass particles of less than 100 microns. On the outside of the supporting rings axially extending holding bars 78 are attached which engage flanges 80 80'. The strainer basket 38 is then fitted to an adapter flange 82 at flange 80 and to the extension tube 39 at flange 80'. The bars 74 are able to absorb torsional moments and transmit them to the flanges 80,80'. Ends of the bars 74 engage a radial annulus of the flanges 80,80' to aid in alignment of the bars 74. In the screw press separator shown in FIG. 5, the strainer basket is equipped with lateral bars 78 circumferentially offset at regular intervals.

Figure 6:
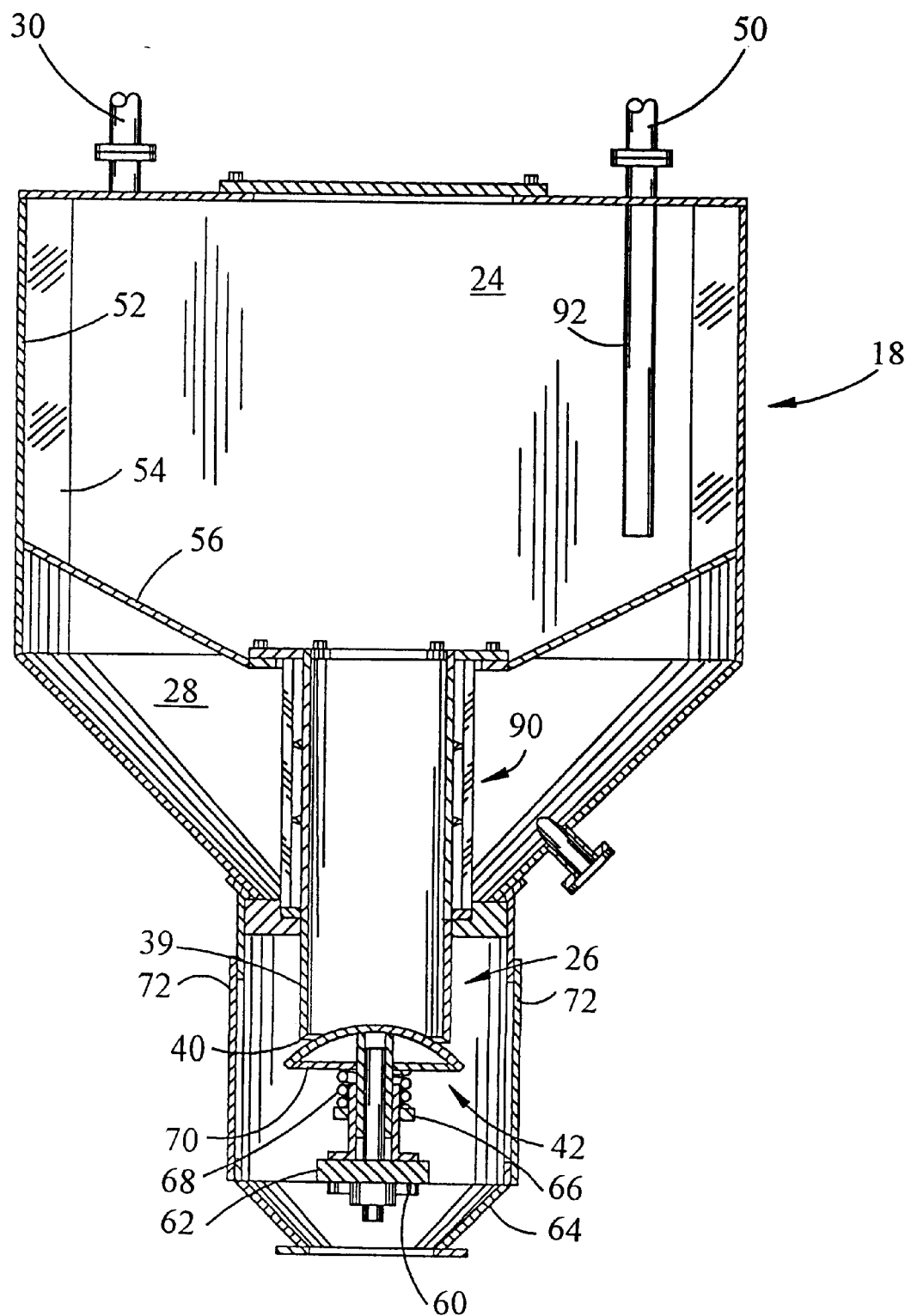
FIG. 6 is an cross section elevation of the vacuum tank with screw press removed.

As seen in FIG. 6 the screw shaft 32 and its drive 34,35 and the screw assembly 38 shown in FIG. 2 maybe removed from the tank 18 and replaced with sleeve assembly 90. Outflow tube 50 may also be extended inside the tank 24 by adding the extension tube 92. These changes allow the tank to be used without compressing the cuttings slurry relying only on the weight of the drill cuttings to open the hemispherical plug 70 by pressing against the spring 68. Liquids may be drawn off or evacuated through extension tube 92 along with any air present in the upper chamber 24 to a liquids collector 19 located at the pump unit 20 in a conventional manner.

Figure 7:
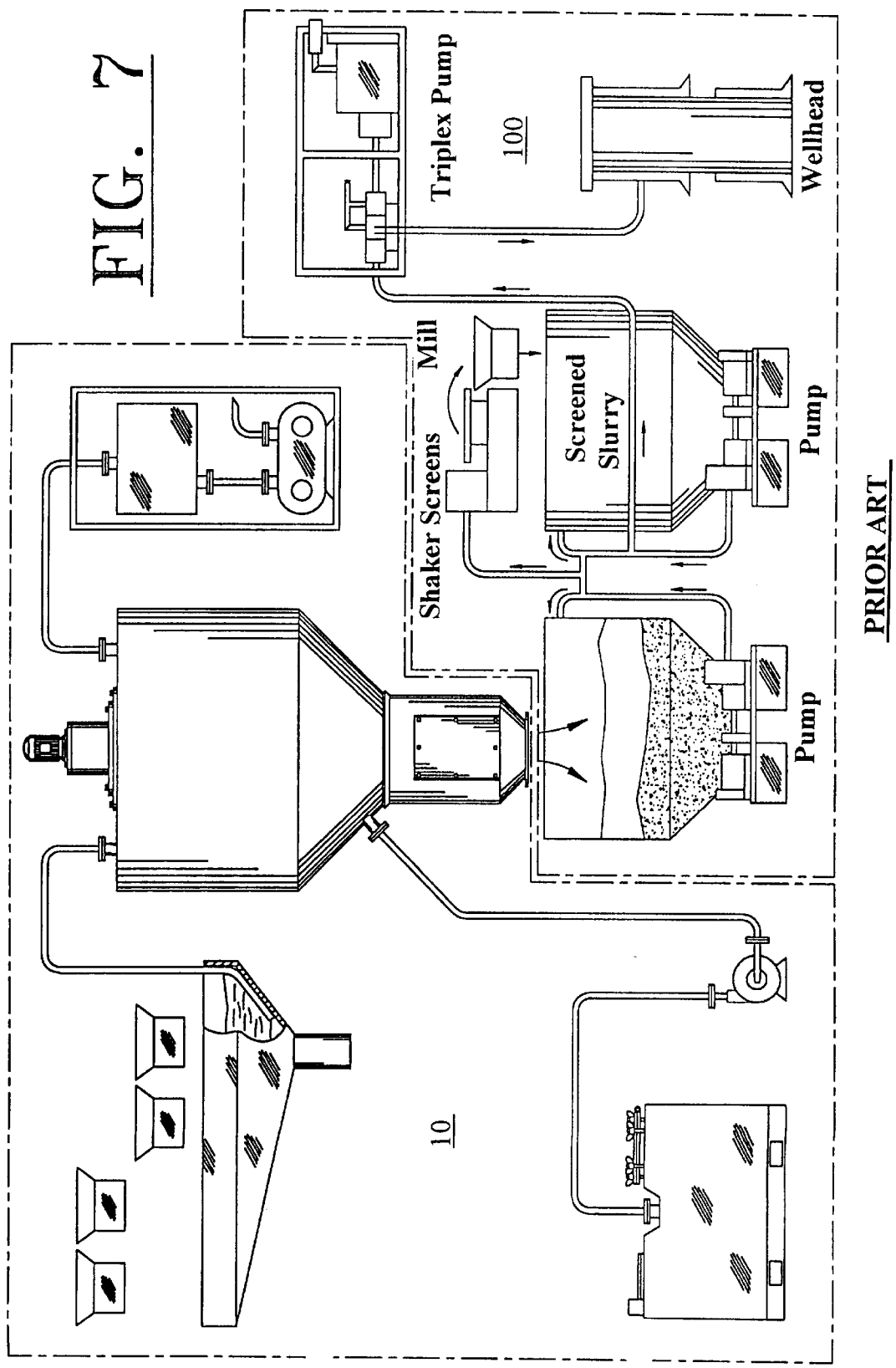
FIG. 7 is a diagram of the system shown in FIG. 1 illustrating its use with a prior art injection system.

As illustrated in FIG. 7 the system 10 may also be utilized as an intermediate step before discharging drill cuttings from separator 18 into a drill cuttings injection processing system 100, thus allowing the cuttings to be injected directly into a well bore at the drill site rather that being transported to a secondary site for treatment and disposal.

Although the present invention has been described in connection with a preferred embodiment therefore, it will be appreciated by those skilled in the art that modification, additions, deletions, and substitutions may be made without departing from the spirit and scope of the invention as defined in the following claims.

What is claimed is:

1. A drill cutting separator system for collecting and separating fluids therefrom comprising:
    a) a separator assembly comprising:
        i) a tank having fixed displacement upper continuous flow slurry inflow chamber and a lower liquid collection chamber said inflow chamber, having continuous inflow and outflow ports, said lower liquid chamber having a positive evacuation liquid outlet port and a solids discharge opening;
        ii) a shaft having a helical portion passing through said upper inflow chamber and said lower liquid chamber said helical portion culminating at said solids discharge opening;
        iii) a means for driving said helical screw and shaft;
        iv) a defluidizing strainer, surrounding a portion of said helical screw, located inside said lower liquid chamber; and
        v) an adjustable plug means for restricting flow though said solids discharge opening;
    b) a first suction line communicative between a cuttings slurry, contained in a shaker screen trough, and said inflow port;
    c) a vacuum pump means for evacuating air from said separator assembly;
    d) a second suction line communicative between said vacuum pump means and separator assembly;
    e) a pump means connected to said liquid outlet port for removing liquids from said separator assembly lower liquid chamber; and
    f) a means for collecting and disposing of said drill cuttings.

2. A separator system according to claim 1 wherein said means for collecting is a solids collections box located adjacent said solids discharge opening.

3. A drill cuttings, collection and fluid separator system according to claim 1 wherein said means for collecting is a drill cuttings, well injection processing system.

4. A separator system according to claim 1 wherein said system further comprises a liquid collection tank.

5. A separator system according to claim 1 wherein said defluidizing strainer comprises:
   a) a plurality of parallel triangular rods extending axially held together in a circumufrentially spaced apart relationship by a plurality of supporting rings and an end flanges attached at each end of said rods;
   b) a plurality of parallel reinforcing rods extending axially between said end flanges connecting said supporting rings; and
   c) an extension tube attached to one of said end flanges.

6. A separator system according to claim 5 wherein said triangular rods are spaced to pass particles less than 100 micron.

7. A separator system according to claim 1 wherein said plug means comprises:
   a) a hemispherical member having a tubular stem portion rotatable and slidable upon said helical screw shaft, cooperative with said extension tube open end;
   b) an adjustable collar and sleeve member, telescopically cooperative with said tubular stem portion; and
   c) a compression spring, slidable upon said sleeve member, active between said adjustable collar and sleeve member and said hemispherical member.

8. A method for collecting, separating and removing drill cuttings from an oil and gas well drilling platform comprising:
   a) suctioning, a drill cutting slurry from a drill cuttings trough via a hose connected to a separator system comprising:
      i) a separator tank assembly comprising:
         a) a single tank divided into fixed displacement upper slurry inflow chamber and lower liquid chamber said upper slurry inflow chamber having inflow and outflow ports, said lower liquid chamber having a liquid outlet port and a solids discharge opening;
         b) a shaft having a helical screw portion passing through said upper slurry inflow chamber and said lower liquid chamber culinating at said solids discharge opening;
         c) a means for driving said helical screw;
         d) a defluidizing strainer, surrounding a portion of said helical screw, located inside said lower liquid chamber; and
         e) an adjustable plug means for restricting flow though said solids discharge opening;
      ii) a vacuum pump assembly for removing air and liquids from said upper inflow chamber;
      iii) a solids collection box located adjacent said solids discharge opening;
      iv) a liquid pump connected to said lower liquid chamber; and
      v) a liquid collection tank connected to said liquid pump;
   b) forcing said cuttings slurry from said upper inflow chamber into said defluidizing strainer via said helical screw shaft;
   c) compacting said cuttings against said adjustable plug means thus forcing fluids and fine particles through said said into said lower liquid chamber;
   d) forcing said adjustable plug means to open against a preset tension thereby discharging said defluidized cuttings;
   e) collecting said defluidized cuttings, discharged by said separation tank assembly; and
   f) collecting liquids being discharged from said separation tank assembly into a liquids collection tank for reprocessing and disposal.

9. A method for collecting, separating and removing drill cuttings from an oil and gas well during drilling operations comprising:
   a) suctioning, a drill cutting slurry from a drill cuttings trough via a hose connected to a separator system comprising:
      1. a separator tank assembly comprising:
         a) a single tank divided into fixed displacement upper slurry inflow chamber and lower liquid chamber said upper slurry inflow chamber having inflow and outflow ports, said lower liquid chamber having a liquid outlet port and a solids discharge opening;
         b) a shaft having a helical screw portion passing through said upper inflow chamber and said lower liquid chamber culminating at said solids discharge opening;
         c) a means for driving said helical screw;
         d) a defluidizing strainer, surrounding a portion of said helical screw, located inside said lower liquid chamber; and
         e) an adjustable plug means for restricting flow though said solids discharge opening;
      2. a vacuum pump assembly;
      3. a liquid pump; and
      4. a liquid collection tank;
   b) forcing said cuttings slurry from said upper inflow chamber into said defluidizing strainer via said helical screw shaft;
   c) compacting said cuttings against said adjustable plug means thus forcing fluids and fine particles through said strainer and into said lower liquid chamber;
   d) forcing said adjustable plug means to open against a preset tension thereby discharging said defluidized cuttings;
   e) collecting said defluidized cuttings, discharged by said separation tank assembly;
   f) processing said defluidized cuttings for injection into the formation adjacent the well being drilled; and
   g) collecting liquids being discharged from said separation tank assembly into a liquids collection tank for reprocessing.

* * * * *